United States Patent [19]

Leenknegt

[11] Patent Number: 5,189,293
[45] Date of Patent: Feb. 23, 1993

[54] OPTICAL SCANNING APPARATUS INCLUDING BEAM FOCAL POINT POSITION CONTROL WHEN OUT OF FOCUS RANGE

[75] Inventor: George A. L. Leenknegt, Eindhoven, Netherlands

[73] Assignee: U.S. Philips Corporation, New York, N.Y.

[21] Appl. No.: 844,259

[22] Filed: Mar. 2, 1992

[30] Foreign Application Priority Data

Jun. 27, 1991 [EP] European Pat. Off. ........ 91201634.2

[51] Int. Cl.$^5$ .......................... G01J 1/20; G11B 7/00
[52] U.S. Cl. .............................. 250/201.5; 369/44.27; 369/44.41
[58] Field of Search ............... 250/201.5, 201.4, 201.2, 250/201.6; 369/44.25, 44.27, 44.28, 44.32, 44.41, 44.42

[56] References Cited

U.S. PATENT DOCUMENTS

| | | | |
|---|---|---|---|
| 4,446,546 | 5/1984 | Miller | 250/201.5 |
| 4,561,080 | 12/1985 | Yamazaki | 250/201.5 |
| 4,636,625 | 1/1987 | Emoto et al. | 250/201.5 |
| 4,677,605 | 6/1987 | Abed | 250/201.5 |
| 4,683,560 | 7/1987 | Takeuchi et al. | 250/201.5 |
| 4,703,466 | 10/1987 | Konno | 250/201.5 |
| 4,740,679 | 4/1988 | Doi | 250/201.5 |
| 4,769,801 | 9/1988 | Funada et al. | 250/201.5 |
| 5,070,491 | 12/1991 | Horie | 250/201.5 |
| 5,103,439 | 4/1992 | Bierhoff et al. | 369/44.27 |

Primary Examiner—David C. Nelms
Assistant Examiner—Michael Messinger
Attorney, Agent, or Firm—Leroy Eason

[57] ABSTRACT

A radiation source (1) in an optical scanning apparatus generates a beam (2). The beam (2) is focused on a plane (5) of a medium (6) by means of an optical system (3,4). With the aid of a focus actuator (8) a focal point (9) of the beam (2) may be moved relative to the plan e (5). A focus detection unit (7) derives a focus error signal (FE) which, within a predetermined focus range (B), is indicative of the distance (dl) between the focal point (9) and the plane (5). Furthermore, the focus detection unit (7) generates a focus position signal (CA) denoting that the focal point (9) is positioned outside said focus range (B). A control circuit (33) derives a control signal (FA) for the actuator (8) from the focus error signal (FE) so as to keep the focal point (9) substantially in the plane (5). The detection arrangement further includes a signal generator (44, 41, 51, 51a, 52) responsive to the focus position signal (CA), for generating a substitute control signal (FA) varying with time for the focus actuator (8) so as to bring the focal point (9) back to the focus range (B) if the focus position signal (CA) denotes that the focal point (9) has transgressed the focus range (B). Generating the substitute control signal (FA) is commenced in a direction depending on the sign of the focus error (FE) at the instant the focal point (9) departs from the focus range. When a control circuit is used comprising an integrator (41) for generating a control signal (FA) in response to the integrated value of the focus error signal (FE), the integrated value at the output of the integrator (41) is pre-eminently suitable for use as an initial value of the substitute signal (FA).

2 Claims, 4 Drawing Sheets dd # OPTICAL SCANNING APPARATUS INCLUDING BEAM FOCAL POINT POSITION CONTROL WHEN OUT OF FOCUS RANGE

BACKGROUND OF THE INVENTION

1. Field of the Invention

The invention relates to an optical scanning device comprising a radiation source for generating a radiation beam, an optical system for focusing the radiation source to a focal point on a plane of a medium, a focus actuator for shifting the radiation beam focal point relative to the plane, a focus detection unit for deriving a focus error signal which, in a predetermined focus range, is indicative of the distance between the focal point and the plane, and for deriving a focus position signal which denotes whether the focal point is positioned outside said focus range, a focus control unit comprising a control circuit for deriving an actuator control signal in response to the focus error signal so as to keep the focal point essentially in the plane, and a signal generator responsive to the focus position signal for generating a substitute focus actuator control signal that varies with time when the focus position signal denotes that focal point has transgressed the focus range and for terminating the generation of the substitute control signal in response to a signal that denotes that the focal point has come back to the focus range.

2. Description of the Related Art

A device of this type is known from U.S. Pat. No. 4,669,074. The optical detection device described therein is included in an optical reading system for reading optical record carriers having a reflective recorded information layer. During the reading operation the focal point of the radiation beam is kept in the plane of the information layer. Due to, for example, mechanical shocks or disc defects, the focal point may happen to depart from the focus range, so that there is no longer a focus error signal available and no focus control is possible any more. In such prior-art device the departure from the focus range is detected, and after such a detection the substitute control signal varying with time is generated in the form of a triangular-wave signal which cause the focal point to be moved to and fro perpendicular to the information layer. During this operation the focal point passes the focus range and the generation of the substitute control signal is terminated during the passage of the focus range. Since no information can be read from the information layer during the period of time when the focal point is outside its focus range, it is important to bring the focal point back to the plane of the information layer as quickly as possible.

SUMMARY OF THE INVENTION

It is an object of the invention to provide an arrangement in which the focal point, once it departs from the focus range, is rapidly brought back to the focus range.

This object is achieved by means of an arrangement according to the opening paragraph, which is characterized in that the signal generator comprises means for initiating generation of the substitute control signal in a direction which depends on a signal that is indicative of the sign of the focus error when the focal point departs from the focus range.

The instant it is detected that the focal point departs from the focus range, the focus error signal is no longer indicative of the magnitude of the focus error, it is true, but the sign of such signal is at this moment still indicative of the direction of the focus error. By rendering the direction of the substitute control signal at the start of the capturing procedure responsive to this sign, it is achieved that immediately upon starting the capturing procedure the focal point is moved in the direction of the focus range and so the focus range is rapidly reached. Capturing is desirably commenced from an initial position on the side of the focus range at which the focal point has departed from this focus range. This initial position may be one of the final positions of the motion range of the focus actuator. From which initial position a start is to be made is determined by the sign of the focus error when the focus range is departed from. However, the capturing is preferably commenced as close as possible to the position of the focus actuator at the instant of loss of focus.

An embodiment of the invention in which this is achieved is characterized in that the control circuit comprises an integrator for controlling the focus actuator in response to the integral of the focus error signal, the signal generator being arranged for initiating generation of the substitute control signal at a value corresponding to the value of the integrated focus error signal when the focal point departs from the focus range.

This embodiment uses the fact to advantage that with such an integrated control the integrated focus error signal is indicative of the position of the focus actuator.

BRIEF DESCRIPTION OF THE DRAWING

Further embodiments as well as their inherent advantages will be described in detail with reference to the drawing FIGS. 1 to 5, in which.

DESCRIPTION OF THE PREFERRED EMBODIMENT

Figure 1:
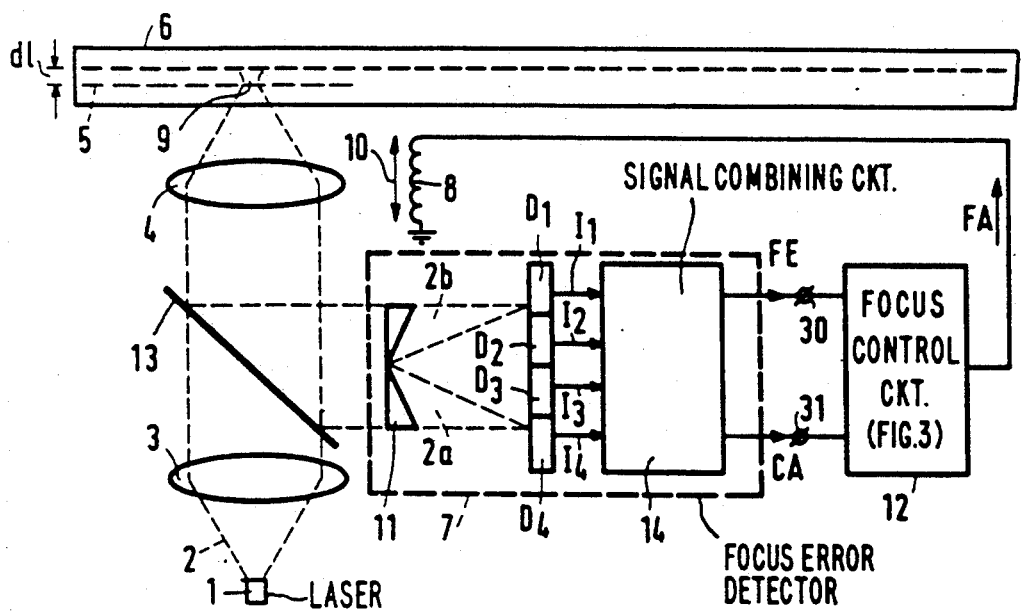
FIG. 1 shows an embodiment of an optical detection arrangement according to the invention.

FIG. 1 diagrammatically shows a focus control device according to the invention. A radiation source 1 in the form of, for example, a semiconductor laser, generates a beam 2. With the aid of an optical system comprising lenses 3 and 4 the beam 2 is focused to a focal point 9 on a plane, for example, the plane of a reflective record layer 5 of an optical information carrier 6. By means of a focus actuator 8 the lens 4 and thus the focal point 9 of the beam 2 may be moved perpendicular to the information layer in a direction denoted by an arrow 10. The beam reflected from the information layer 5 is directed to a focus error detection unit 7 via a beam splitter in the form of, for example, a semi-transparent mirror 13. The focus error detection unit 7 is a unit of a customary type which derives a focus error signal FE and a focus error position signal CA from the reflected beam. The focus detection unit 7 may be of the so-called Foucault-type. Such a type comprises a beam splitter, for example, in the form of a roof top prism 11 with which the reflected beam is split into two subbeams 2a and 2b which are focused on four radiation-sensitive detectors D1, D2, D3 and D4 arranged in line. The detectors D1, ... D4 produce four signals I1, ... I4 which are indicative of the radiation received by the relevant detectors. A signal combining circuit 14 derives therefrom the focus error signal FE and the focus position signal CA, for example, in accordance with the equations:

$$FE = (I1 + I4) - (I2 + I3)$$

$$CA = I1 + I2 + I3 + I4.$$

By way of illustration the variation of the signals FE and CA is plotted against the focus error d1, that being the distance between the focal point 9 and the information layer 5.

Figure 2:
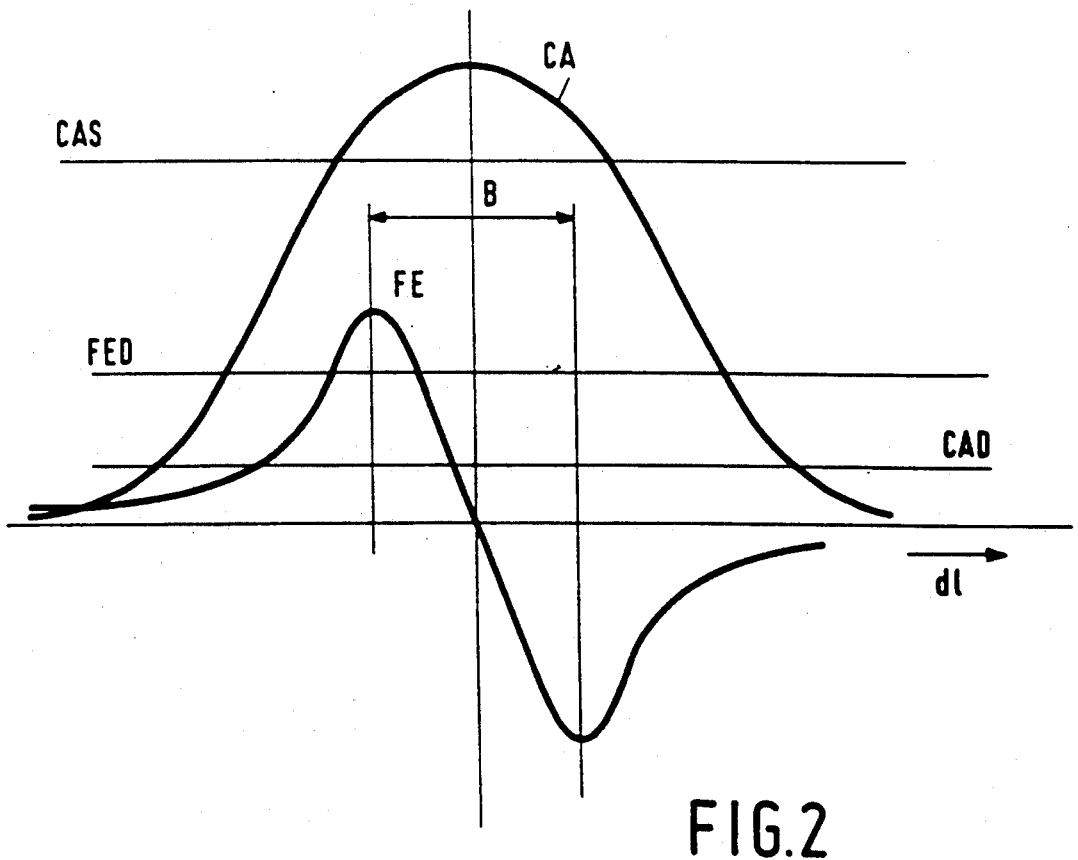
FIG. 2 shows a focus error signal and a focus position signal as functions of the focus error.

Within a focus range B the focus error signal FE is indicative of the focus error d1. The signal CA exhibits a maximum if the focus error is equal to zero, and gradually diminishes with an enhancing focus error d1. The signal CA is therefore also indicative of the focus condition. That is, if the signal CA falls below a certain threshold for a predetermined period of time, for example, of the order of several ms, which threshold is, for example, the threshold CAD shown in FIG. 2, the focal point 9 may be assumed to have departed from the focus range B over such a distance that a focus control system for controlling the position of the focal point in response to the focus error signal FE will no longer be capable of bringing the focal point back to the plane of the information layer 5. The signals FE and CA are applied to a control unit 12 which derives from these two signals a control signal FA for controlling the focus actuator 8.

In the embodiment shown, a focus detection unit of the so-called double Foucault type is used for deriving values from the focus error signal FE and focus position signal CA. Such focus error signals may also be obtained with focus detection units of a different type, for example, of the astigmatic type or the single Foucault type.

Figure 3:
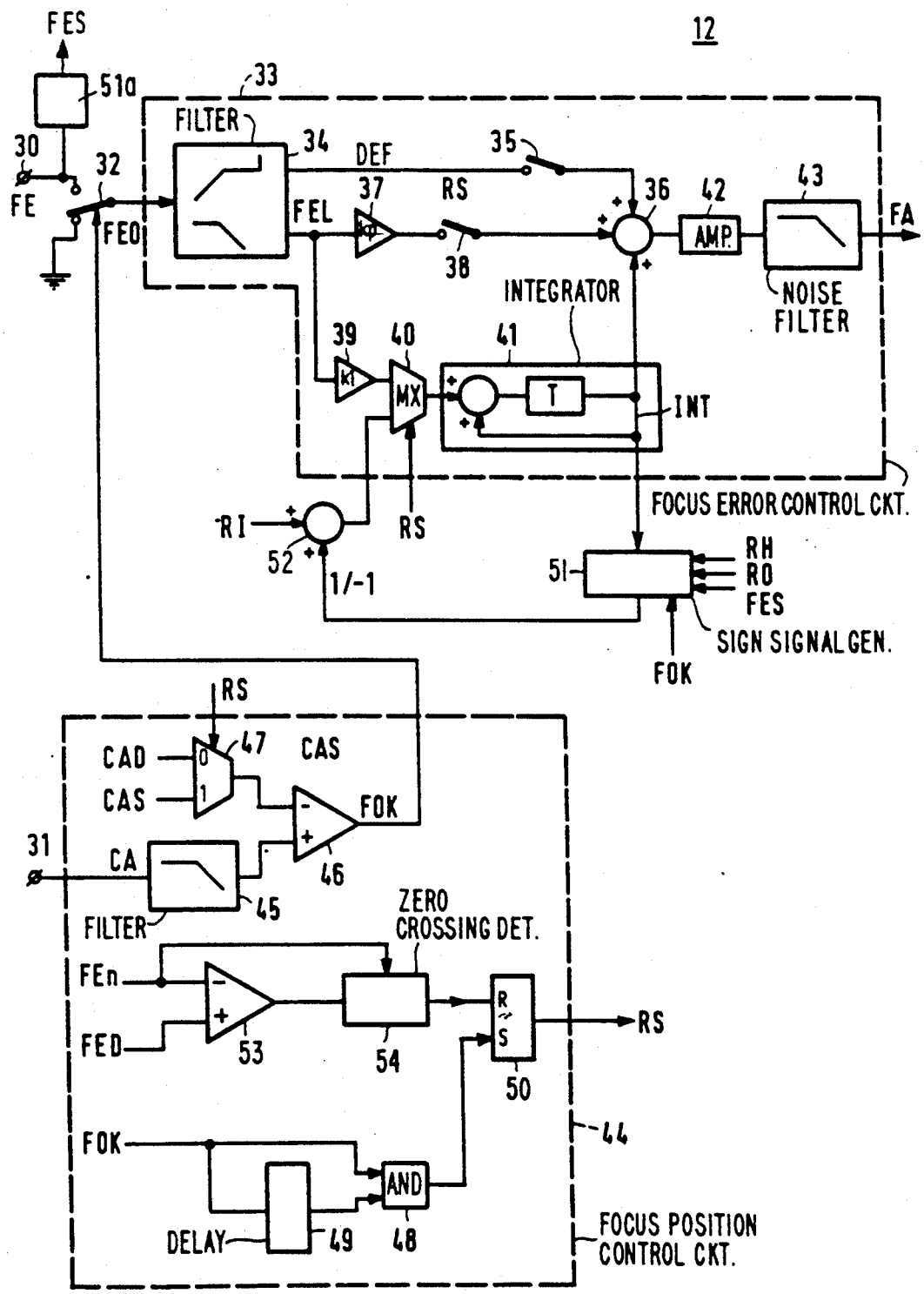
FIG. 3 shows an embodiment of a control unit to be used in the optical detection arrangement.

FIG. 3 shows by way of example an embodiment of the control unit 12. The control unit has an input 30 for receiving the focus error signal FE. The focus error signal FE is applied via an electronically operated switch element 32 to a focus control circuit 33 for deriving the control signal FA from the focus error signal FE. The control circuit 33 is a circuit of a customary type that derives a control signal which is a linear combination of the focus error signal FE, the differentiated value of the focus error signal FE and the integrated value of the focus error signal FE. In the embodiment shown the control circuit 33 comprises a filter circuit 34 whose input is coupled to the input 30 via the switch element 32. The filter circuit 33 is arranged for separating the high-frequency component DEF from the focus error signal FE. This high-frequency component DEF is, in essence, equal to the differentiated value of the focus error signal FE. The high-frequency component DEF is applied to an adder circuit 36 via an electronically operated switch element 35. The filter circuit 34 furthermore transfers the focus error signal freed of the high-frequency components. This focus error signal free of high-frequency components is referenced FEL. The signal FEL is also applied to the adder circuit 36 via an amplifier 37 having gain factor kp and via an electronically operable switch element 38. The signal FEL is further applied to an integrator 41 via an amplifier 39 having gain factor ki and via a multiplex circuit 40. The integrated value at the output of the integrator 41 is also applied to the adder circuit 36. The output signal of the adder circuit 36 is applied to a noise filter 43 via an amplifier 42 having an adjustable gain factor so as to adjust the loop gain of the focus control loop. The output signal of the noise filter 43 operates as the control signal FA for the actuator 8.

During normal operation in which the focal point 9 is kept in the focus range B, the switch element 32 is in a state in which the focus error signal FE is passed to the filter circuit 34. The switch elements 35 and 38 are then in the conductive state and the multiplex circuit 40 is in a state in which the output signal of the amplifier 39 is passed to the integrator 41. Under these circumstances the control circuit 33 controls the actuator 8 by adjusting the control signal FA, so that the focus error signal FE and thus the focus error d1 in essence remain equal to zero. Due to external disturbances, such as, for example, shocks or defects of the information carrier 6, it may happen that the focal point departs from the focus range, so that the control circuit 33 is no longer capable of bringing the focal point 9 back to the plane of the information layer 5. The control unit 12 therefore also comprises a focus position control circuit 44 for detection of a departure from this focus range by the focal point 9 and which includes a capturing circuit for generating a substitute control signal for the actuator 8 in response to a detection of a departure from the focus range by the control circuit 44 so as to bring the focal point 9 again back to the focus range B. The control circuit 44 has an input 31 for receiving the position error signal CA. The signal CA at input 31 is applied to the non-inverting input of a comparator 46 via a low-pass filter 45. The inverting input of the comparator 46 is supplied with the output signal of a dual-input multiplex circuit 47. The inputs of the multiplex circuit are supplied with two level reference signals representing thresholds CAD and CAS(cf. FIG. 2) respectively. The multiplex circuit 47 is controlled by a control signal RS which assumes a logic 0-value during normal operation in which the focus control is effected in response to the focus error signal FE. The control is such that when the signal RS has a logic 0-value, the reference level signal representing the threshold CAD is applied to the comparator 46. If the signal level of the signal CA comes below the threshold CAD, the comparator produces a logic signal FOK having a logic 1-value. In response to this signal the switch element 32 is brought to a state in which the input of the filter circuit 34 is supplied with a signal FEO which has a signal value corresponding to a zero focus error. The signal FOK is also applied to a first input of AND gate 48 and a delay circuit 49 which delays the signal FOK by about 3 ms. The signal thus delayed is applied to the second input of the AND gate 48. The AND gate 48 produces a logic 1 signal if the signal CA remains below the threshold CAD for at least 3 ms. In that case there may be assumed that the reduction of the signal level of the signal CA is caused by the fact that the focal point has departed from the focus range and not by a so-called drop-out which generally causes a drop of the signal level of the signal CA for a much shorter period of time.

The control circuit 44 in the embodiment shown detects the departure from the focus range in response to the focus position signal indicative of the sum of the radiation received by the sub-detectors D1, ..., D4. It should be observed, however, that the departure from the focus range may also occur in response to different focus position signals. For example, in the event of an information pattern being detected, the departure from the focus range may be detected in response to a signal denoting the presence of a high-frequency component in the detected signals.

The output signal of the AND gate 48 is applied to a set input of a flip-flop 50, which, in response to a 0-1 transition at the set input, is brought to a state in which an output signal having a logic 1-value is produced. The output signal of the flip-flop 50 is the control signal RS. A 0-1 transition in the control signal RS thus denotes that the focal point 9 has departed from the focus range. The signal RS is used for controlling the switch elements 35 and 38 which are brought to a non-conductive state if the control signal RS has a logic 1-value. The signal RS is furthermore used for activating a signal generator for causing a substitute control signal to be supplied to the actuator so as to bring the focal point 9 back to the focus range B.

The signal generator comprises a sign signal generating circuit 51 for generating a 1/−1 signal having a positive unit value of +1 or a negative unit value of −1 depending on the sign of the focus error signal FE at the instant at which the departure from the focus range by the focal point 9 is detected. For determining the sign of the unit value, the circuit 51 is supplied with a signal FES, which is indicative of the sign of the focus error signal, as well as the signal FOK. The signal FES may be derived from the focus error signal FE, for example, with the aid of a customary polarity detector 51a. The 1/−1 signal is applied to a multiplier 52 in which the signal is multiplied by an adjustable value RI. The output signal of the multiplier is applied to the integrator 41 via the multiplexer 40.

The operation of the signal generator is as follows. Once it has been established that the focus range B has been left by the focal point 9, the signal RS assumes the logic 1 value. Consequently, the multiplexer 40 is brought to a state in which the output signal of the multiplier 52 is applied to the integrator 41. In addition, the switch elements 35 and 38 are brought to the non-conductive state. All this causes the original control signal, which used to depend directly on the focus error signal FE, to be replaced by a substitute control signal FA which solely depends on the signal value at the output of the integrator 41. The output signal of the multiplier 52 is applied to the input of the integrator 41, so that the output signal of the integrator and thus a substitute control signal FA, which depends on the sign of the 1/−1 signal, will augment or diminish at a constant rate. This means that the focal point is moved in a direction perpendicular to the plane of the information layer 5.

Figure 4:
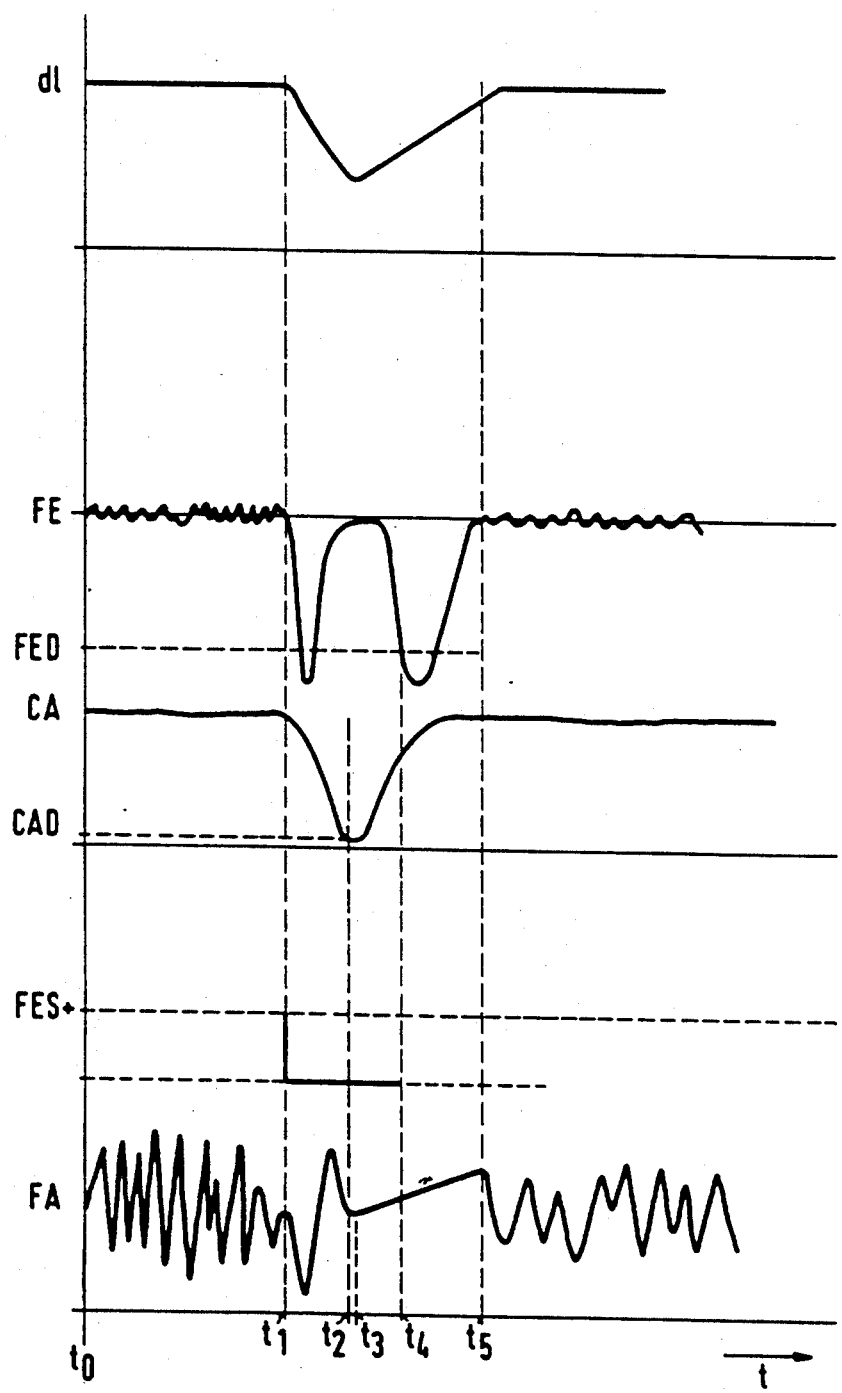
FIG. 4 shows a plurality of signals occurring in the optical detection arrangement as a function of time.

By selecting the sign of the 1/−1 signal equal to the sign of the focus error signal at the instant the focus error range is departed from, there is achieved that the focal point 9 is again moved in the direction of the focus range in response to the substitute control signal FA. By way of illustration, FIG. 4 shows the variations of the signals d1, FE, CA, FES and FA plotted against time t for a situation in which the focal point departs from the focus range B due to a disturbance. In the time interval from t0 to t1 the position of the focal point 9 is controlled by the control circuit 33 on the basis of the focus error signal FE. At instant t1 a disturbance takes place due to which the focal point 9 departs from the focus range B. As a result, the magnitude of the focus error signal FE rapidly increases to subsequently decrease to substantially zero. The magnitude of the signal CA rapidly decreases. At instant t2 the signal CA reaches the threshold CAD, so that the supply of the focus error signal FE to the control circuit 33 is interrupted and the signal FEO is applied to the control circuit. The control signal FA is then solely determined by the value of the output signal of the integrator 41. This value is indicative of the average signal level of the control signal over the preceding interval. At instant t2 the sign of the focus error signal is determined, which sign is denoted by the signal FES. When the threshold CAD is reached by the signal CA, the magnitude of the focus error signal FE has decreased, it is true, but the sign of the focus error signal FE still reliably denotes the direction of the focus error d1. At instant t3, which is about 3 ms after instant t2, it may be assumed that the decrease of the signal CA is caused by shifting the focal point 9 to outside the focus range B and the signal generator for generating the substitute control signal for the actuator 8 will be activated by means of the signal RS. This means that the input of the integrator 41 is supplied with the output signal of the multiplier 52, so that the output signal of the integrator 41 and thus the signal FA will change at a constant rate in a direction determined by the signal FES at the instant t2. Consequently, the actuator 8 will guide the focal point 9 in the direction of the focus range B, so that the focus error d1 will decrease. At instant t5 the focus error has again become zero and the signal generator may be inactivated and the focus-error-signal responsive control can be restored. For inactivating the signal generator and restoring the control responsive to the focus error signal FE, the control circuit 44 comprises a comparator 53 for comparing the absolute value of the focus error signal with a threshold FED. When this threshold is transgressed, the comparator 53 (at instant t4) produces a signal for activating the zero crossing detector 54 for detection of the zero crossing by the focus error signal. Subsequently, in reaction to a zero crossing of the focus error signal, the zero crossing detector 54 applies a pulse to a reset input of the flip-flop 49, so that the latter is brought to a state in which the signal level of the signal RS again assumes the logic 0-value. As a result, the signal generator is again inactivated under the control of the multiplexer 40 and the switch elements 35 and 38 are again rendered conductive. In addition, the threshold CAD is re-applied to the comparator 46 so that, under the control of the signal FOK, the switch element 32 is brought to a state in which the control circuit is again connected to the input 30. All this results in the fact that the original control of the focal point position on the basis of the focus error signal FE is restored.

Figure 5:
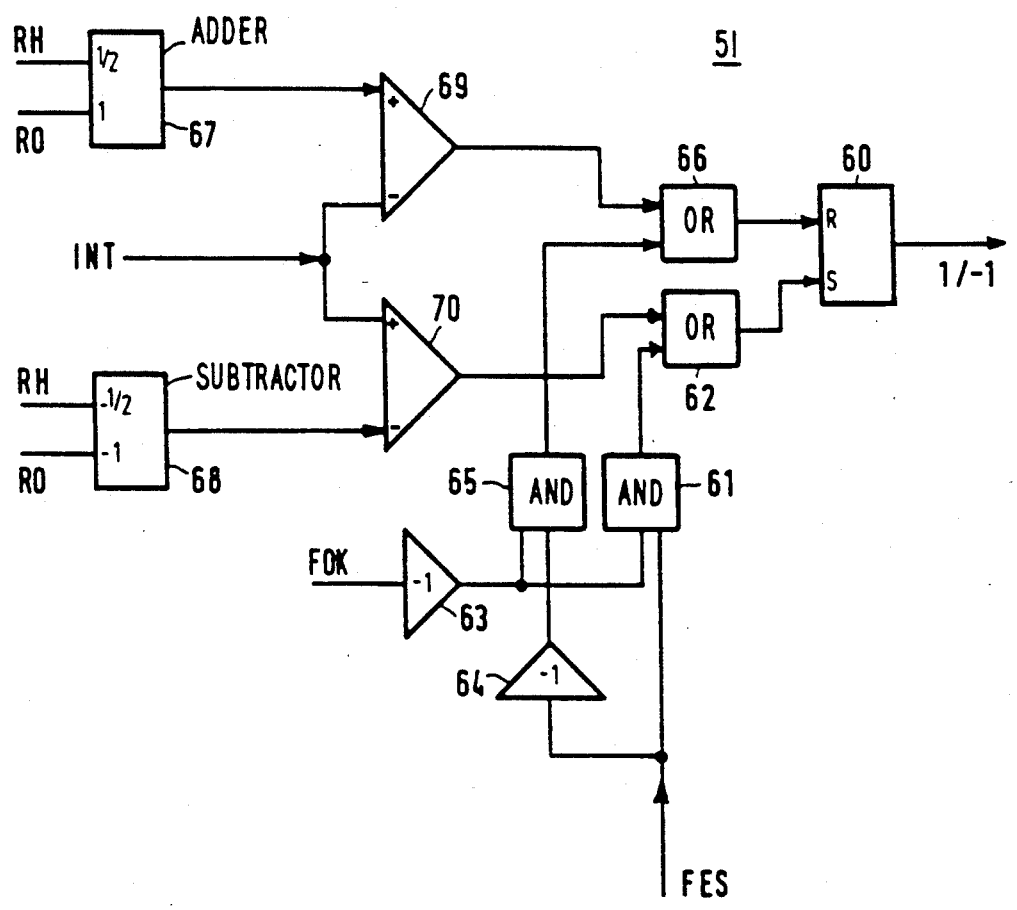
FIG. 5 shows a detailed diagram of a circuit to be used in the control unit.

FIG. 5 shows an embodiment of the circuit 51 for generating the 1/−1 signal. The circuit comprises a so-called set-reset flip-flop 60 from whose output the 1/−1 signal may be tapped. The signal FES is applied to the set input of the flip-flop 60 through an AND gate 61 and an OR gate 62. The AND gate 61 additionally receives a signal FOK inverted by an inverter. This means that as long as the signal FOK denotes that the signal CA lies above the threshold CAD, the signal FES is passed to the set input of the flip-flop 60. The moment the signal FOK denotes that the signal CA has dropped below the threshold CAD, the output of the inverter assumes the logic 0-value and the passage of the signal FES through the AND gate 61 is blocked. The value of the signal FES inverted by an inverter 64 is applied to a reset input of the flip-flop 60 via an AND gate 65 and an OR gate 66. The inverted value of the signal FOK at the output of the inverter 65 is also applied to the AND gate 63, so that the inverted value of the signal FES is constantly passed as long as the signal FOK denotes that the signal CA lies above the threshold CAD. In this manner the output signal of the flip-flop 60 always follows the value of the signal FES until the moment at which the signal CA drops below the threshold CAD and the value of the output signal is maintained at the value occurring at the moment the threshold CAD is transgressed by the signal CA.

The circuit shown in FIG. 5 may further include means for changing the polarity of the $1/-1$ signal if the value of the output signal INT of the integrator 41 transgresses an adjustable upper threshold or adjustable lower threshold during capturing. The upper and lower thresholds are derived from a signal RH which is indicative of the distance between the upper and lower thresholds and a signal RO which is indicative of the offset of the upper and lower thresholds relative to a zero level. For determining the upper and lower thresholds on the basis of the signals RH and RO, the circuit 50 comprises an adder circuit 67 and a subtractor circuit 68. The upper threshold and the lower threshold at the outputs of the circuits 67 and 68 are applied to comparators 69 and 70 respectively, for comparing the upper and lower thresholds with the output signal INT of the integrator 41. The output signals of the comparators 69 and 70 are applied to the reset and set input respectively, of the flip-flop 60 through the OR gates 66 and 62.

In the embodiment described hereinbefore, the control signal generator comprises the integrator 41 of the control circuit 33 for generating the substitute control signal for the actuator 8. Alternatively, it is possible to realise the signal generator without utilizing components of the control circuit 33. In that case the upper or lower threshold may be used as an initial value for the substitute signal FA when the focus control is to be captured anew, depending on whether the focal point has transgressed the upper or lower boundary respectively, of the focus range. This is indicated by the signal FES at the instant the focus range is departed from. If the focal point, once it has departed from the focus range, is situated between the focus range and the upper threshold represented by a positive value of the focus error on departure from the focus range, the capturing is started with a value of the substitute control signal which corresponds to the upper threshold. It is to be preferred, though, to select as an initial value a value that corresponds to the integrated value at the output of the integrator 41, because in that case a value of the substitute control signal is started with for which the focal point is much closer to the focus range.

I claim:
1. Optical scanning apparatus comprising:
a radiation source for generating a radiation beam;
an optical system including means for focusing the radiation beam to a focal point on a plane;
focus actuator means for controlling said focusing means to shift the focal point relative to said plane;
focus detection means for deriving a focus error signal (FE) which, in a predetermined focus range, is of a magnitude and sign indicative of the distance and direction of departure of the focal point from said plane, and for further deriving a focus position signal (CA) when the focal point is positioned outside said focus range;
a focus control unit comprising a control circuit for deriving a focus actuator control signal (FA) in response to the focus error signal (FE) and supplying said control signal (FA) to said actuator means to cause said actuator means to maintain the focal point essentially on said plane;
a signal generator responsive to the focus position signal (CA) to cause said control circuit to generate a substitute focus actuator control signal when the focus position signal (CA) signifies that the focal point has transgressed said focus range, and for terminating the substitute control signal when the focal point has returned to said focus range, the substitute control signal varying with time; and
means comprised in said signal generator for causing the substitute control signal to be initiated in a direction determined by the sign of the focus error signal (FE) at the time of departure of the focal point from said focus range.
2. Apparatus as claimed in claim 1, wherein the control circuit comprises an integrator for integrating the focus error signal (FE), the control circuit controlling the focus actuator means in accordance with the integrated focus error signal; and said signal generator is adapted to initiate the substitute control signal at a value determined by the value of said integrated focus error signal at the time of departure of the focal point from said focus range.

* * * * *